United States Patent
Lindstrom et al.

[15] 3,659,639
[45] May 2, 1972

[54] SKINNING MACHINE HAVING A RECIPROCATING FAT REMOVING KNIFE MECHANISM THEREOF

[72] Inventors: Oscar H. Lindstrom; Nathan A. Fischer, both of Austin, Minn.

[73] Assignee: Geo. A. Hormel & Co., Austin, Minn.

[22] Filed: May 20, 1970

[21] Appl. No.: 39,110

[52] U.S. Cl. ............................................. 146/130
[51] Int. Cl. ......................................... A22c 17/12
[58] Field of Search ............... 146/130, 151, 158; 83/590

[56] References Cited

UNITED STATES PATENTS

| | | | |
|---|---|---|---|
| 2,715,427 | 8/1955 | Townsend | 146/130 |
| 1,975,044 | 9/1934 | Kelly | 146/130 |
| 1,847,536 | 3/1932 | Pruefer | 146/151 X |
| 2,612,198 | 9/1952 | Schlegel | 146/151 X |
| 2,920,342 | 1/1960 | Spang et al. | 146/158 X |

Primary Examiner—Willie G. Abercrombie
Attorney—Williamson, Palmatier & Bains

[57] ABSTRACT

A skinning machine for removing skin from hams includes a frame having a driven roll mounted thereon, the roll including a plurality of axially spaced apart serrated blades thereon which revolve in close proximity to a pressure shoe. The pressure shoe has an elongate skinning blade fixedly mounted thereon which is positioned closely adjacent the driven roll. An elongate fat removing blade is mounted closely adjacent the pressure shoe and is longitudinally reciprocable relative to the pressure shoe and is operable during its reciprocating movement to facilitate removal of excess fat from the ham prior to the skin removing operation.

3 Claims, 3 Drawing Figures

Patented May 2, 1972  3,659,639

INVENTORS
OSCAR H. LINDSTROM,
NATHAN A. FISCHER
BY Williamson, Palmatier & Bains
ATTORNEYS

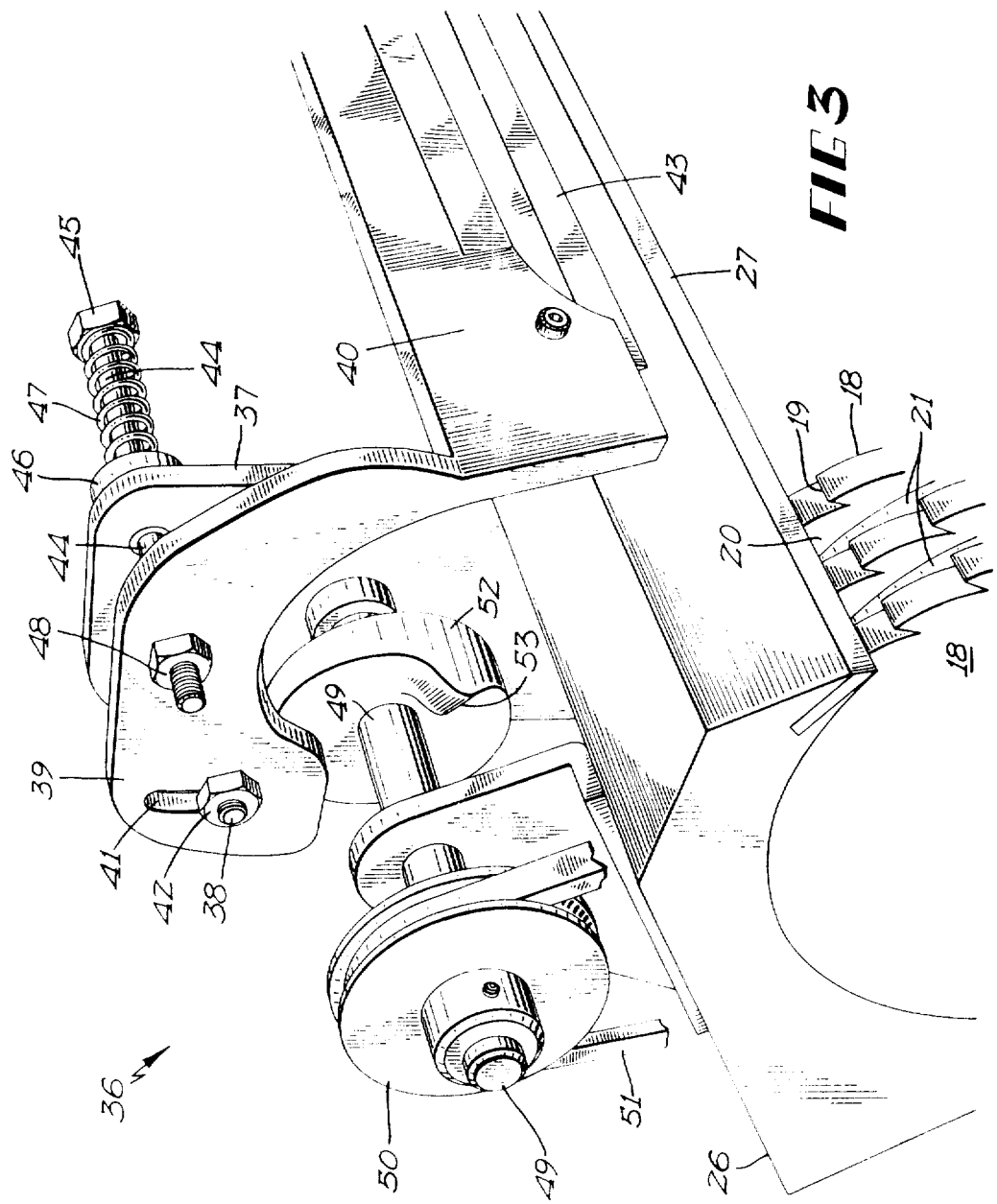

SKINNING MACHINE HAVING A RECIPROCATING FAT REMOVING KNIFE MECHANISM THEREOF

SUMMARY OF THE INVENTION

In the processing of hams, the skin is removed from the ham and this is done by commercially available skinning machines. In most hams, one portion thereof which is not covered by the skin has an excessive amount of fat, and it is desirable to remove this excess fat prior to the skin removing operation. Removal of this excess fat not only facilitates removal of the skin from the ham but also permits the fat removing operation done in a subsequent step after removal of the skin to be done more effectively since the fat will be more uniform on the ham at that time.

It is therefore a general object of this invention to provide a reciprocating fat removing cutting device for a skinning machine. This fat removal knife device is mounted on the pressure shoe of the skinning machine and is driven from the power means for the machine by suitable drive connections. This fat removing cutting device is of simple and inexpensive construction, and may be readily incorporated on a conventional skinning machine without requiring material changes in the machine.

BRIEF DESCRIPTION OF THE FIGURES OF THE DRAWINGS

FIG. 3 is a fragmentary perspective view of the novel fat removing cutting device.

DETAILED DESCRIPTION OF THE INVENTION

Figure 1:
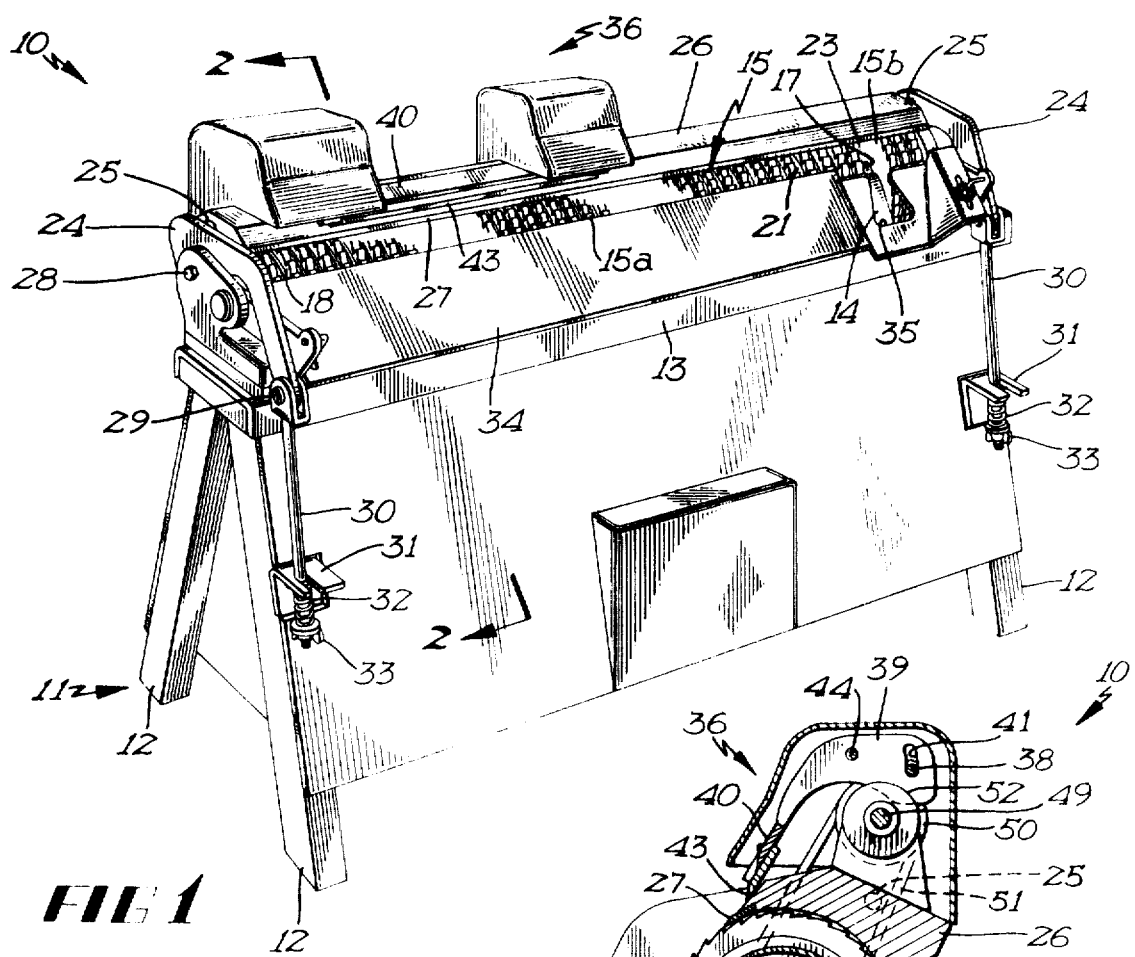
FIG. 1 is a perspective view of a skinning machine incorporating the novel fat removing cutting device.

Referring now to the drawings and more specifically to FIG. 1, it will be seen that one embodiment of the ham skinning machine, designated generally by the reference numeral 10 is there shown. This skinning machine includes a frame 11 which is comprised of a pair of generally vertically oriented leg members 12 interconnected by suitable longitudinal frame elements. The leg members 12 comprise a pair of downwardly and diverging leg elements which are rigidly interconnected to each other and to the other leg members. to form the rigid frame 11. An elongate generally channel-shaped mounting member 13 is rigidly affixed to the upper ends of the leg members 12 and it will be noted that this mounting member is horizontally oriented.

A pair of longitudinally spaced apart bearings 14 are rigidly affixed to the upper surface of the mounting member 13 adjacent opposite ends thereof and serves to revolvably support an elongate horizontally oriented driven roll 15. The driven roll 15 is comprised of a generally cylindrically shaped tubular body 16 secured to an elongate shaft 17, the latter journalled in the bearings 14. The tubular body 16 has a plurality of axially spaced apart serrated blades 18 affixed thereto and projecting radially therefrom. These blades 18 are generally circular and each has teeth 19 formed throughout the circumference thereof.

The annular space 20 defined between adjacent blades 18 is uniform and each accommodates one of a plurality of substantially identical curve stripper elements 21. These stripper elements serve to strip the skin and fat from the roll during the skinning operation. It is pointed out that the stripper elements and roll 15 are substantially identical to that disclosed in co-pending application Ser. No. 804,862, filed Mar. 6, 1969, now U.S. Pat. No. 3,545,036.

It will be noted that the driven roll 15 is arranged so that the body and blades define a pair of sets or roll sections which are designated 15a and 15b. The cylindrical space 23 defined between the two roll sections is located adjacent one end portion of the machine as best seen in FIG. 1.

A pair of elongate mounting arms 24 are each connected by a pivot 25 to one end of an elongated pressure shoe 26. This pressure shoe 26 has a slot therein which receives a substantially flat elongate skinning blade 27, the blade being secured to the pressure shoe by suitable bolts or the like. The cutting edge of the blade 27 actually projects forwardly of the pressure shoe and is disposed in close proximal relation with respect to the serrated blades 18.

Each mounting arm is also pivotally connected by a pivot 28 to one of the bearings 14. Each mounting arm 24 is also pivotally connected by a pivot 29 to the U-shaped upper end of an elongate hold-down bolt 30. These hold-down bolts are located on opposite sides of the skinning machine and each has its lower end projecting through an L-shaped bracket 31. A wing nut 33 is secured to the lower threaded end portion of each bolt and engages a collar which in turn engages the lower end of a helical spring 32 which is positioned around each hold-down bolt. The upper end portion of each helical spring engages another collar which bears against the L-shaped bracket so that the pressure shoe is pivotally but yieldably mounted in predetermined relation with respect to the driven roll 15.

the skinning machine is also provided with an elongate substantially flat guard member 34 which is adjustably mounted by means of the bearings 14 on the frame 11 to permit the guard member to be adjusted relative to the driven roll 15. The guard member is provided with a U-shaped portion 35 adjacent the roll section 17b and cooperates with the other elements to define the knuckle bone removing mechanism disclosed in the co-pending application Ser. No. 804,862, now U.S. Pat. No. 3,545,036. All of the apparatus described hereinabove is disclosed in the co-pending application referred to hereinabove and this apparatus not only permits the skin to be removed from the ham, but the knuckle bone to be removed by the same machine.

Figure 2:
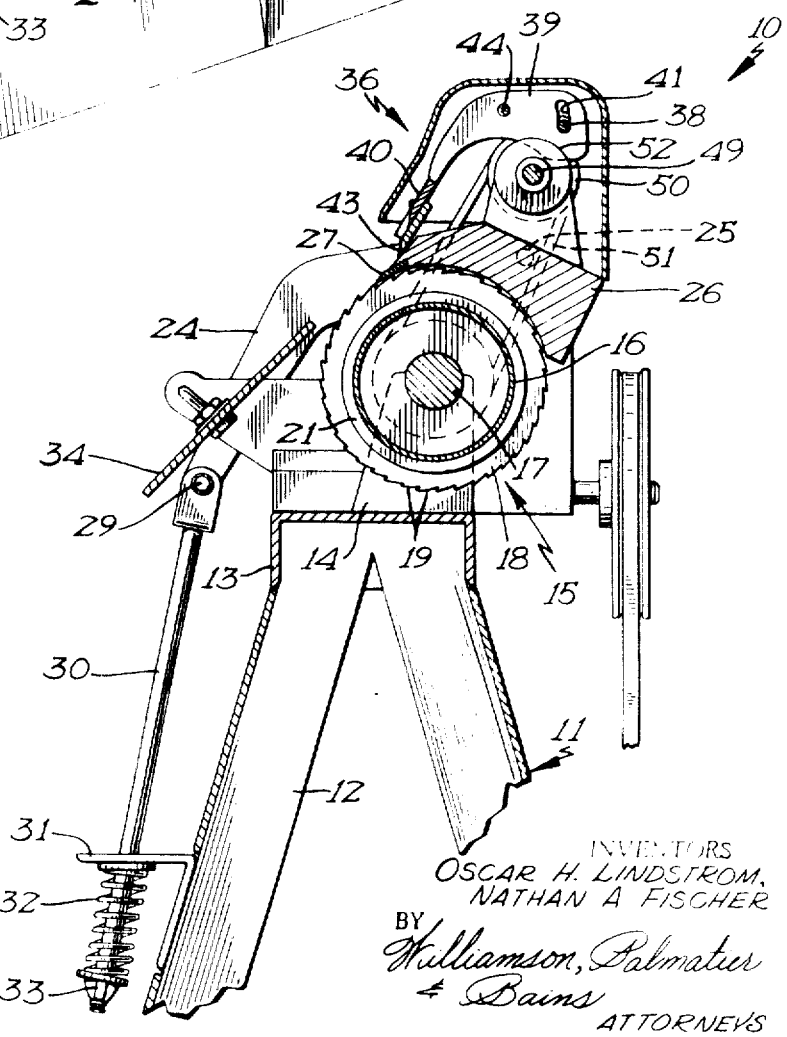
FIG. 2 is a fragmentary cross-sectional view thereof.

Means are also provided for removing the excess fat from that portion of the ham which is not covered by skin. This fat removing device, designated generally by the reference numeral 36 is mounted upon the pressure shoe 26, is operable to cut the excess fat from the ham. To this end, it will be seen that the cutting device includes a pair of brackets 37 which are spaced apart and which are secured to the upper surface of the shoe as best seen in FIG. 2. Each bracket has a pair of openings therein, one opening accommodating a mounting bolt 38 therethrough. Each of these mounting bolts also projects through an elongate arcuate slot 41 in one of a pair of arms 39 which are secured to opposite ends of an elongate fat removing blade 40. Each mounting bolt 38 has its outer most end threaded for accommodating a nut 42. Although not shown in the drawings, each mounting bolt 38 also has a shoulder thereon which engages the inner surface of the associated arm 39. It will be noted that only one end portion of the cutting device is shown in FIG. 3, but the other end portion is substantially the same as that shown in FIG. 3.

Each bracket 37 also has another opening therein through which projects an elongate thrust rod 44 which also projects through an opening in the associated arm 39. The thrust rod 44 has a head 45 at one end thereof and a collar is slidably positioned on the thrust rod intermediate the ends thereof. A spring 47 is interposed between the thrust rod head 45 and the slidable collar 46 thereon, as best seen in FIG. 3. A nut 48 threadedly engages the threaded outer end of the thrust rod and is positioned against the exterior or outer surface of the associated arm 39. With this arrangement, the blade 40 is capable of longitudinal or reciprocating movement against the bias of the yieldable springs 44.

Means are provided for reciprocating the blade 40 and this means includes a revolvable shaft 49 which is journalled in one of the brackets 37 and is located adjacent one of the arms 39 of the blade 40. The shaft 39 has a pulley 50 keyed thereto about which is trained an endless drive belt 51 which is also trained about another pulley. The last mentioned pulley (not shown) is connected to the power means (electric motor) for revolving the driven roll 15.

The shaft 49 also has a revolvable cam 52 keyed thereto for rotation therewith, and one face of the cam presents a cam surface 53 which engages the inner vertical surface of the adjacent arm 39 of the blade 40. This outer cam face of the cam 52 has a convex cam surface portion 53 which serves to urge the blade 40 longitudinally to the left as viewed in FIG. 3 when the cam is revolved. After the cam surface portion 53 traverses the arm 39, the springs associated with the thrust rods will urge the blade 40 in the opposite directions. Thus the blade 40 is power shifted through a forward stroke by the cam drive and is urged in its return stroke by means of the yieldable springs 47.

The mounting bolts 38 permit the blade 40 to be adjusted relative to the pressure shoe 26 so that the disposition of the cutting edge 43 of the blade may be threadedly adjusted. Suitable cover elements 54 are positioned over the mounting bolts, arms and thrust rods located at opposite end portions of the fat removing cutting device.

During operation of the fat removing cutting device, the skinning machine motor will be energized to revolve the driven roll 15 and to oscillate the fat removing device 36. The operator may then hold that surface portion of the ham having the excess fat thereon but not covered by the skin adjacent the oscillating fat removing device, so that the blade 40 will readily cut the fat from the ham as the ham has been manipulated against the oscillating blade. Thereafter the knuckle bone may be removed, and finally the skin removed by the coaction of the skinning blade and roll 15.

With this arrangement, the subsequent final fat removing operation which is accomplished at another station, may be more effectively carried out. The fat removing device 36 is driven from the electric motor which revolves the driven roll 15 and does not require any substantial material alteration to the ham skinning machine 10. Thus the entire treatment of the ham, including skin removal, knuckle bone removal, and excess fat removal may be accomplished at a single station by a single operator. The fat removing device very effectively and efficiently removes the excess fat from that portion of the ham not covered by the skin and therefore facilitates the other treatment steps performed on the ham.

From the foregoing description it will be seen that we have provided a novel fat removing device which has been incorporated on a ham skinning machine and which permits removal of excess fat from the ham prior to the skin removing operation.

Thus it will be seen that the fat removing device incorporated on the ham skinning machine is not only of simple and inexpensive construction, but a device which functions in a more efficient manner than any heretofore known comparable device.

We claim:

1. In a skinning machine comprising
   a frame,
   a driven roll including an elongate shaft journaled on said frame, a cylindrical body on said shaft, a plurality of axially spaced apart generally circular serrated radial blades on said cylindrical body extending radially outwardly therefrom,
   a pressure shoe positioned in close proximal relation to said roll and having a leading edge,
   a skinning blade projecting from said leading edge,
   an elongate fat removing blade, means mounting said fat removing blade in spaced close proximal relation above said shoe and extending longitudinally of the latter, said blade being longitudinally reciprocable relative to said shoe through forward and return strokes,
   drive means including a driven member engaging said fat removing blade to drive the same longitudinally through its forward stroke, and a horizontally disposed helical spring yieldably resisting movement of the fat removing blade through its forward stroke and causing said fat removing blade to be moved in its return stroke,
   and means for adjusting the vertical spacing of said fat removing blade relative to said shoe, comprising a pair of generally vertically oriented openings each being located in one end of said blade, and a pair of pins each projecting through one of said openings.

2. The skinning machine as defined in claim 1 wherein said driven member comprises a cam, and power means for revolving said cam.

3. The skinning machine as defined in claim 2 wherein said blade is provided with an arm, and said cam is revolvable and engages said arm to drive the same through a forward stroke.

* * * * *